United States Patent
Ozaki (10) Patent No.: US 7,570,280 B2
(45) Date of Patent: Aug. 4, 2009

(54) IMAGE PROVIDING METHOD AND DEVICE

(75) Inventor: Nobuyuki Ozaki, Nishitokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 973 days.

(21) Appl. No.: 11/053,947

(22) Filed: Feb. 10, 2005

(65) Prior Publication Data
US 2005/0265619 A1  Dec. 1, 2005

(30) Foreign Application Priority Data
May 28, 2004  (JP)  ............................. 2004-158855

(51) Int. Cl.
*H04N 7/00* (2006.01)
*G02B 3/00* (2006.01)
(52) U.S. Cl. ........................................ 348/36; 359/664
(58) Field of Classification Search ................ 348/36, 348/40, 39; 382/103; 359/664; 701/208
See application file for complete search history.

(56) References Cited

U.S. PATENT DOCUMENTS 5,004,328 A * 4/1991 Suzuki et al. ............... 359/664
6,115,480 A * 9/2000 Washizawa .................. 382/103
2002/0049532 A1 * 4/2002 Nakamura ................... 701/208

FOREIGN PATENT DOCUMENTS

| JP | 3051173 | 3/2000 |
| JP | 3126955 | 11/2000 |
| WO | WO 92/21208 | 11/1992 |
| WO | WO 97/05741 | 2/1997 |
| WO | WO 03/010599 A1 | 2/2003 |

\* cited by examiner

*Primary Examiner*—Gims S Philippe
(74) *Attorney, Agent, or Firm*—Finnegan, Henderson, Farabow, Garrett & Dunner, L.L.P.

(57) ABSTRACT

Visual-field information including information on sight-line direction (theta, phi) and on field angle (gamma) in visual-field area of input fish-eye image is input in real-time. From the input visual-field information, a drawing area of a plane is calculated in real-time that is orthogonal to the sight-line direction and has an extent determined by the field angle. A pixel position in the fish-eye image that corresponds to each pixel position in the calculated drawing area is determined. This forms in real-time a dewarped image from the fish-eye image with its distortion removed.

12 Claims, 9 Drawing Sheets

IMAGE PROVIDING METHOD AND DEVICE

CROSS-REFERENCE TO PRIOR APPLICATION

This application is based upon and claims the benefit of priority from the prior Japanese Patent Application No. 2004-158855, filed on May 28, 2004, the entire content of which is incorporated herein by reference.

BACKGROUND OF THE INVENTION

1. Field of the Invention

The present invention relates to an image providing method and device which nonlinearly develops on a display plane an image in any sight-line direction in a fish-eye image (omnidirectional image), and more particularly, to an interactive type image providing method and device which can provide in real-time an moving image in a direction intended by an observer.

2. Description of the Related Art

In a monitoring system using a monitoring camera, for example, a method is known for collecting a wide-angle image using a monitoring camera with a fish-eye lens instead of a monitoring camera with a usual lens to obtain a wider monitorable area. In this case, a monitoring camera with a fish-eye lens provides an fish-eye image more distorted than an image provided by a monitoring camera with a usual lens. A non-linear transformation processing is thus known that displays on a plane a distortion-removed image in any sight-line direction from the fish-eye image. Such a non-linear transformation processing is referred to a normalization processing (dewarp).

Known methods for dewarping a fish-eye image include, for example, methods disclosed in Japanese patents No. 3051173 and No. 3126955. Dewarping logics are formulated into transformation equations that are generally similar. The dewarping methods have thus been implemented as a device with a programming language using any transformation equation, or implemented after fixing areas to be drawn at a plurality of places and creating previously a transformation rule in a table-lookup form based on a equation.

In the method disclosed in Japanese patent No. 3051173 on page 5 in the right column for lines 19 through 30 and FIG. 4, X-MAP processor and Y-MAP processor speed up the mapping on a sphere. Also in the method disclosed in Japanese patent No. 3126955 on page 5, paragraph 0021, and FIG. 1, two coordinate-operation parts use a look-up table to speed up the coordinate computation on a sphere.

In both methods disclosed in above-mentioned Japanese patents No. 3051173 and No. 3126955, however, a non-linear transformation processing uses a mapping on a sphere as a basis to sequentially calculate display pixels, and the dewarping is only performed in visual fields from a plurality of predetermined limited places, thereby providing poor interactivity.

SUMMARY OF THE INVENTION

An image providing device according to an aspect of the present invention comprises: a fish-eye image input device inputting fish-eye image; a fish-eye image storage device storing said input fish-eye image; a visual-field information input device inputting in real-time visual-field information including information on sight-line direction (theta, phi) and on field angle (gamma) in visual-field area of said fish-eye image; a drawing area calculation device for calculating in real-time, using said input visual-field information, each pixel of a drawing area in a plane which is orthogonal to said sight-line direction and has an extent determined by said field angle; and a dewarping processing device determining a pixel position in said fish-eye image which corresponds to each pixel position in said calculated drawing area to form in real-time a dewarped image from the fish-eye image with its distortion removed.

DETAILED DESCRIPTION OF THE INVENTION

Referring now to the drawings, embodiments of the present invention will be described below.

<Basic Concept of the Dewarping Processing>

Figure 1:
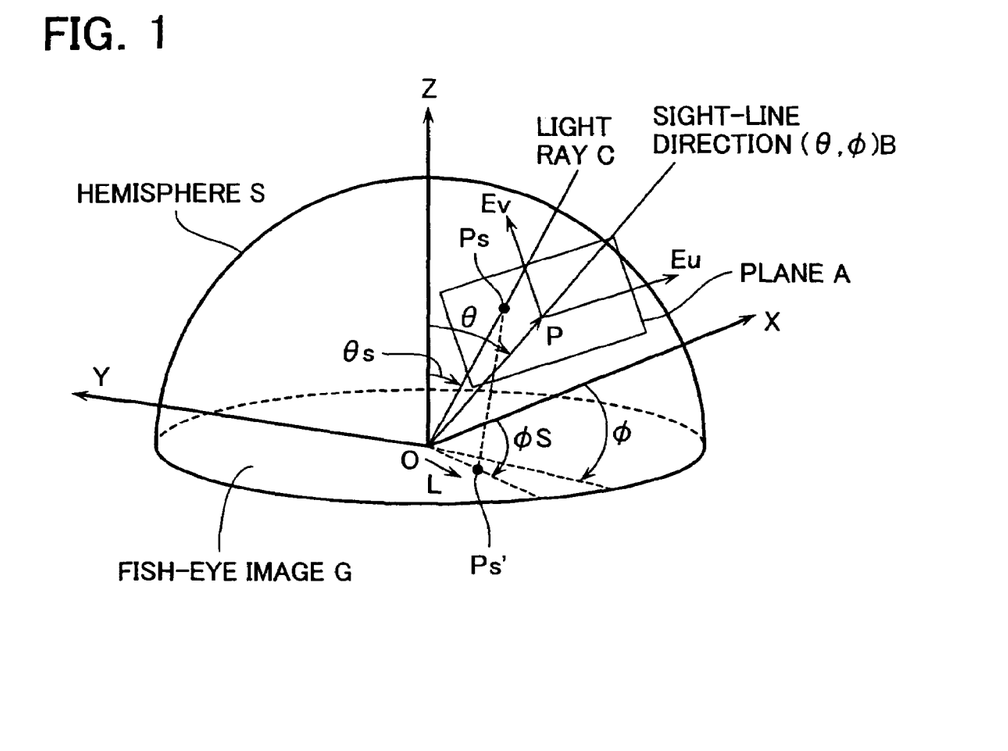
FIG. 1 illustrates basic concept of the dewarping processing according to the present invention.
Figure 2:
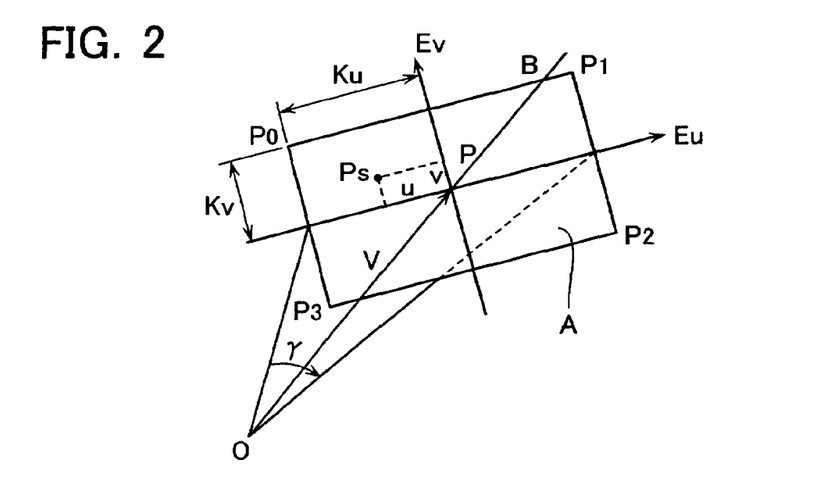
FIG. 2 illustrates basic concept of the dewarping processing according to the present invention.
Figure 3:
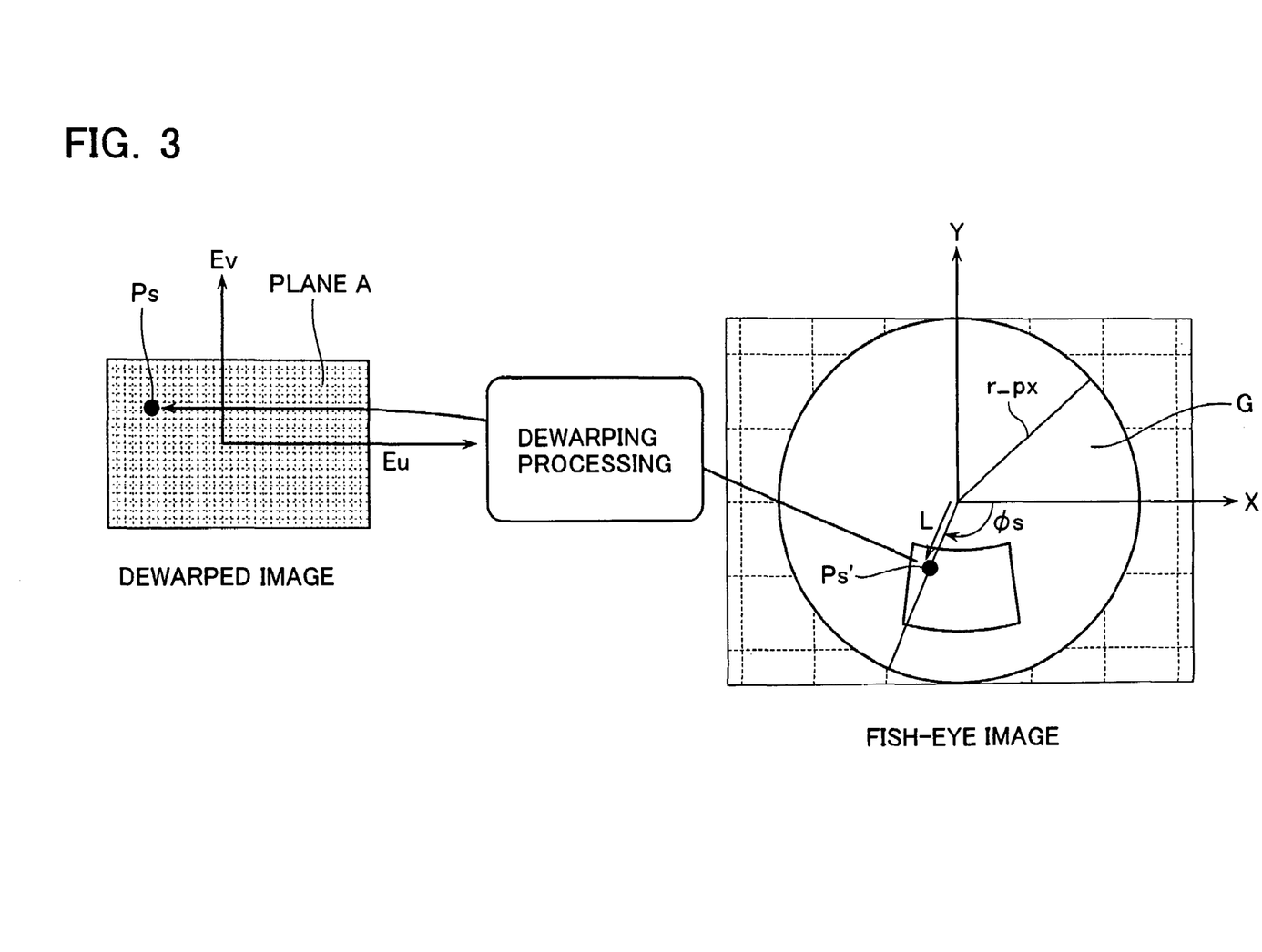
FIG. 3 illustrates basic concept of the dewarping processing according to the present invention.

FIGS. 1 to 3 illustrate the basic concept of the dewarping processing according to the embodiment of the present invention.

As shown in FIG. 1, a fish-eye image can be regarded as an image (distorted all-direction image) derived from an object imaged on a hemispherical surface of a virtually established hemisphere S being developed on a plane (the circular bottom surface of the hemisphere S). In this hemisphere S, with the origin O being at the center of its bottom circle, a three-dimensional coordinate system is established with orthogonal directions X-axis and Y-axis from the origin O in a plane including the bottom circle and the direction Z-axis from the origin O extending toward the vertex of the hemisphere S.

Input information is now given as sight-line direction B from the origin O toward the hemispherical surface. Sight-line direction B is given by a zenithal angle (tilt) theta of an angle from Z-axis and an azimuthal angle (pan) phi of an angle from X-axis. This sight-line direction B is a visual-field center of a viewer. As shown in FIG. 2, an additionally specified zoom magnification (field angle gamma) specifies a portion to be drawn (viewed) as plane A (imaging plane of a virtual perspective camera) that is orthogonal to sight-line direction B and tangent to the hemispherical surface shown in FIG. 1. Any position in plane A can be expressed in a two-dimensional coordinate system of Eu and Ev with the origin at intersection P with a line indicating sight-line direction B.

This plane A is referred to a " drawing area. "Dewarping processing" corresponds to reconstruction of this drawing area from the original fish-eye image (distorted all-direction image developed on the circular bottom surface of hemisphere S).

A description will now be given of the processing of reconstruction of the drawing area from the fish-eye image. For example, point Ps on plane A is expressed as an intersection between plane A and light ray C that is defined by zenithal angle theta s and azimuthal angle phi s. The brightness of point Ps can thus be determined by calculating the three-dimensional coordinates of point Ps with theta and phi of sight-line direction B to determine theta s and phi s of light ray C passing through point Ps, and by determining the pixel position of corresponding point Ps' in the fish-eye image based on a model equation of the fish-eye projection.

Specifically, given that hemisphere S is a unit sphere of radius=1 and plane A indicating the drawing area has a length of 2 Ku in Eu-axis direction and a length of 2 Kv in Ev-axis direction as shown in FIG. 2, Ku and Kv can be determined with a zoom magnification (field angle gamma) and the aspect ratio alpha of drawing area, as follows.

$$Ku=\tan(gamma/2)$$

$$Kv=alpha*\tan(gamma/2) \quad \text{(Equation 1)}$$

The aspect ratio alpha depends on the window size of the drawing area. Given that the position in Eu-axis direction in plane A is u and the position in Ev-axis direction in plane A is v, three-dimensional coordinates (Px, Py, Pz) of point Ps can be determined as follows.

$$Px=-u*Ku*\sin phi-v*Kv*\cos phi*\cos theta+\sin theta*\cos phi$$

$$Py=u*Ku*\cos phi-v*Kv*\sin phi*\cos theta+\sin theta*\sin phi$$

$$Pz=v*Kv*\sin theta+\cos theta \quad \text{(Equation 2)}$$

The zenithal angle theta s and azimuthal angle phi s of point Ps can thus be determined with Px, Py, and Pz determined, as follows.

$$theta\ s=\tan^{-1}((Px^2+Py^2)^{1/2}/Pz))$$

$$phi\ s=\tan^{-1}(Py/Px) \quad \text{(Equation 3)}$$

The theta s and phi s determined can provide polar coordinates (L, phi s) of point Ps' in fish-eye image G corresponding to point Ps in plane A. As shown in FIG. 3, L is commonly expressed as a one-valued function of L=f (theta), and L=f*theta s is used as a model equation for equidistant projection and L=2f*tan (theta/2) for equi-solid-angle projection. The f is a focal length of the fish-eye lens.

With fish-eye image G having a radius of r_px, and with the use of model equation in the following Equation 4 in which point Ps' is equidistantly projected from the center position O of fish-eye image G to the outermost periphery of fish-eye image G when zenithal angle theta s varies from 0 to pi/2, L can be determined as follows.

$$L=2*r\_px*theta\ s/pi \quad \text{(Equation 4)}$$

The position in the X-Y coordinate system of point Ps' in fish-eye image G corresponding to point Ps in plane A can thus be determined by the following Equation 5.

$$X\_pixel=L*\cos(phi\ s)$$

$$Y\_pixel=L*\sin(phi\ s) \quad \text{(Equation 5)}$$

In each of above-described equations, the focal position of the fish-eye lens and the resolution of the imaging element and the like may change the radius r_px of fish-eye image G and the pixel correspondence between the fish-eye image and dewarped image. Therefore, lens characteristics and CMOS (or CCD) characteristics are preferably considered in Ku and Kv calculation and dewarping processing.

These image transformation computations generally take a long time and make it difficult to realize the real-time processing. To allow for such an image transformation computation at higher speed, it is preferred that the management function device for general management including the input and output of images to and from the external and the interface with input device is separated from the computing module function for dewarping distortion. The dewarping-computing module preferably uses three parallel-processable computing modules.

The First Embodiment

Figure 4:
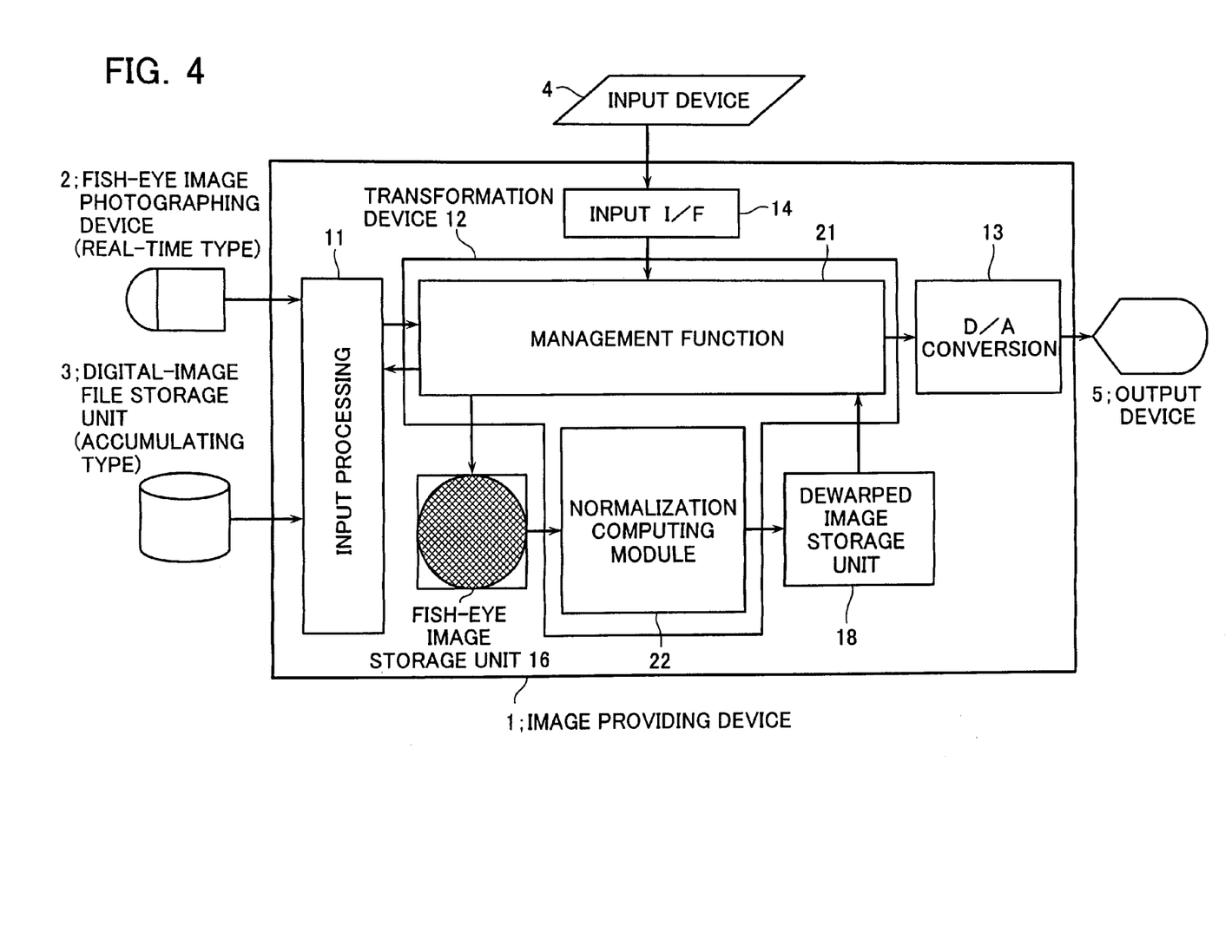
FIG. 4 shows a configuration of an interactive type image display system according to the first embodiment of the present invention.

FIG. 4 shows a configuration of an interactive type image display system according to the first embodiment of the present invention. This system includes: image providing device 1 for transforming a fish-eye image to a dewarped image in a designated visual-field; fish-eye imaging device 2 for providing in real-time an all-direction image, particularly a moving image, to the image providing device 1; digital-image file storage unit 3 for accumulating a fish-eye image that is previously imaged by the fish-eye imaging device and the like in a form of a digital-image file such as MPEG 2 file and JPEG file group and the like; input device 4 for inputting, as an external control, information such as the user-desired sight-line direction (theta, phi) and zoom magnification (field angle gamma); and output device 5 such as a monitor for displaying the dewarped image dewarped by image providing device 1.

Image providing device 1 includes mainly input processing unit 11 for performing an input processing (such as A/D conversion and various decoding processings) of the fish-eye image; transformation device 12 which is the core part of device 1; and D/A conversion unit 13 as an output part. Image providing device 1 also includes: input interface 14 for inputting information, such as a sight-line direction, from input device 4; fish-eye image storage unit 16 for storing original fish-eye image; and dewarped-image storage unit 18 for storing dewarped image.

Transformation device 12 further includes, management function unit 21 for overall management including the input and output of fish-eye image and dewarped image to and from the external and the interface with input device 4, and dewarping computing module 22 for dewarping distortion of fish-eye image.

The above-described configuration incorporates the image that is imaged by fish-eye imaging device 2 to the internal in real-time via input processing unit 11 and holds the image in fish-eye image storage unit 16 as an fish-eye image, under the management of management function unit 21. The image can also be input by performing an input processing of any file of digital-image files (such as MPEG 2 file and JPEG file group, for example) that are previously accumulated in digital-image file storage unit 3 and can also be held as a fish-eye image. To see images in the desired direction, the user (audience) can use input device 4 such as a joystick mouse to input the user-desired sight-line direction (theta phi), zoom magnification (field angle gamma) to the device of the embodiment. The input information is informed via interface 14 to management function unit 21. A simple keyboard mouse input is also possible as an input method for the input information.

Figure 5:
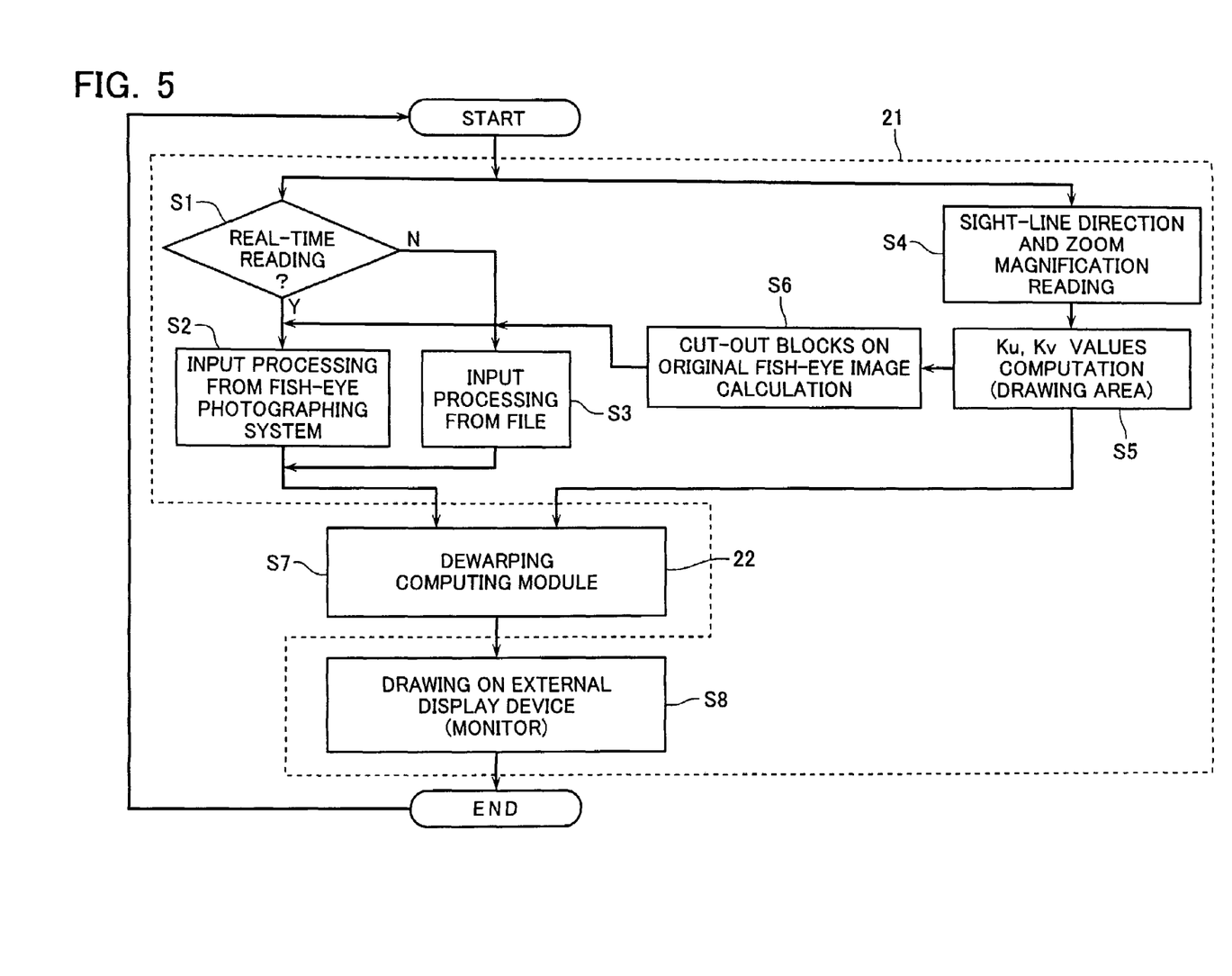
FIG. 5 is a flowchart of the operation of an image-providing device in the display system in FIG. 4.

FIG. 5 is a flowchart of the processing flow of image providing device 1.

Management function unit 21 includes a plurality of management modes. These management modes have (1) a mode for inputting real-time image from the fish-eye photographing system, (2) a mode for inputting accumulated image from the file, (3) a mode for inputting sight-line direction and zoom magnification for display and for controlling display.

Management function unit 21 first operates to determine whether the fish-eye image reading is in the real-time type image input mode or accumulated image input mode (S1). If the reading is in the real-time type image input mode, the image is read in real-time via input processing unit 11 from fish-eye imaging device 2 (S2). If the reading is in the accumulated image input mode, the digital-image file is read via input processing unit 11 from digital-image file storage unit 3 (S3). After read, the fish-eye image is sequentially stored in fish-eye image storage unit 16.

In parallel with this, management function unit 21 performs the mode for inputting sight-line direction and zoom magnification for display and for controlling display to read from input device 4 the sight-line direction (theta, phi) and zoom magnification (gamma) as input information (S4). To see images in the desired direction, the user (audience) can use input device 4 such as a joystick mouse to change in real-time the desired sight-line direction and zoom magnification like the photographing operation of the camera. Management function unit 21 reads the input information in real-time.

After reading the sight-line direction (theta, phi) and zoom magnification (gamma), management function unit 21 computes the values of Ku and Kv specifying the extent of the drawing area based on the above-mentioned Equation 1 (S5). The Ku and Kv are preferably specified also in view of characteristic parameters such as previously stored lens characteristics and CMOS (or CCD) characteristics. Dewarping computing module 22 performs the dewarping processing for the drawing area (S7). Management function unit 21 uses the dewarped image to draw on output device 5 such as a monitor (S8). The above-described processings are performed each time the input information is read.

Figure 6:
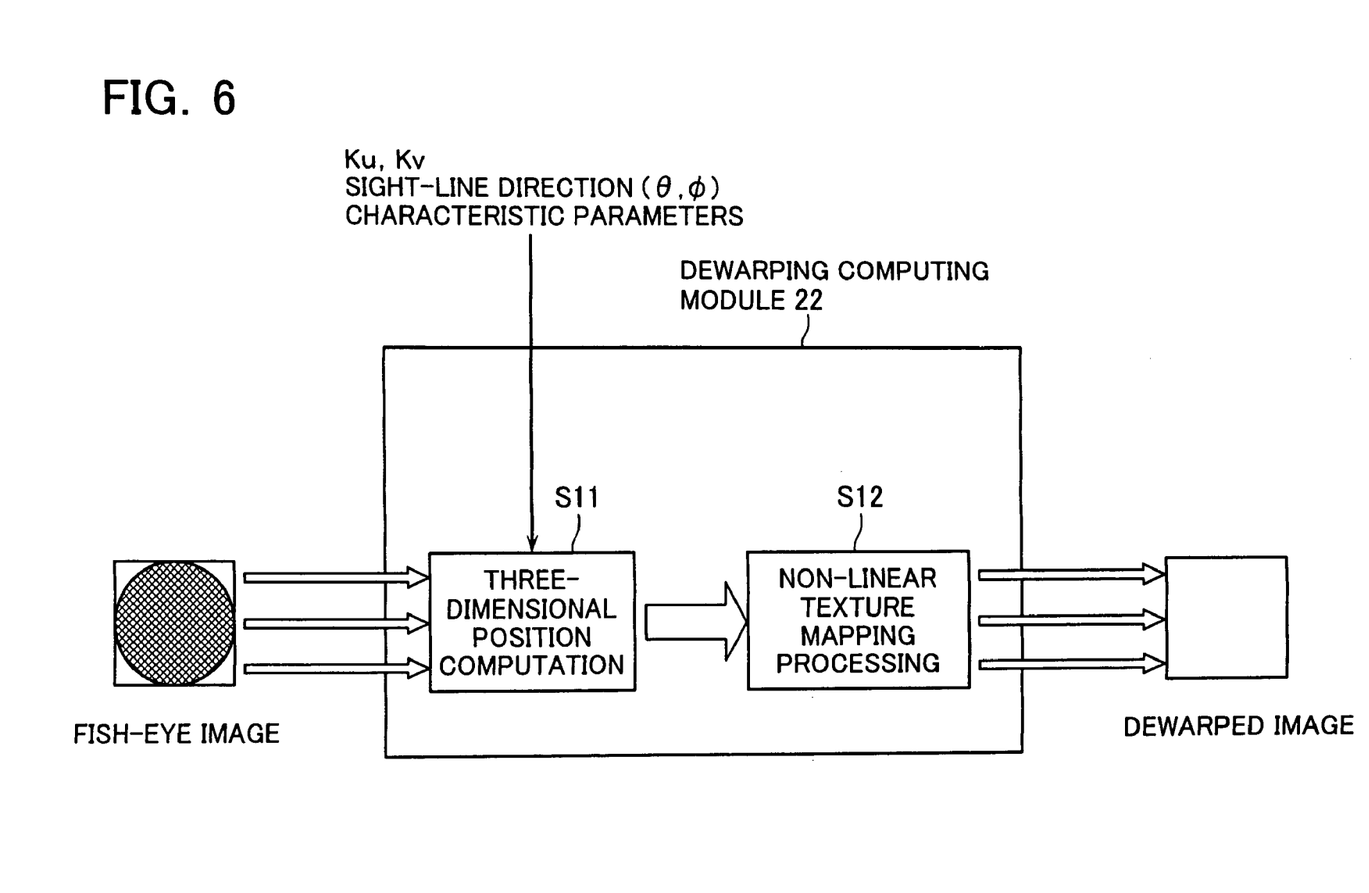
FIG. 6 shows the operation of a dewarping-computing module in the image-providing device in FIG. 5.

The dewarping processing will now be described. FIG. 6 schematically shows the processing in the dewarping module. Dewarping computing module 22 performs the computation processing of the three-dimensional position of each pixel in the drawing area (S11) and three-dimensional non-linear texture mapping processing. (S12) to dewarp the fish-eye image to create the dewarped image.

The computation processing of the three-dimensional position of each pixel in the drawing area (S11) is conducted by, firstly inputting the extents Ku and Kv of the drawing areas calculated in management function unit 21, sight-line direction (theta, phi) provided by input device 4, and previously stored characteristic parameters of the lens and the imaging system and the like, and then operating the above-described Equation 2 to compute the three-dimensional position (Px, Py, Pz) of each pixel (Ps) in plane A indicating the drawing area with updated u and v.

Non-linear texture mapping processing (S12) substitutes the computed results of the three-dimensional position (Px, Py, Pz) of each pixel into the above-described Equations 3 to 5 to calculate the pixel position (x_pixel, y_pixel) in the original fish-eye image G that corresponds to each pixel position in the dewarped image to be drawn in the drawing area, and maps the color information (such as RGB and YUV) at the pixel position in the original fish-eye image G to the corresponding pixel in the drawing area.

Figure 7:
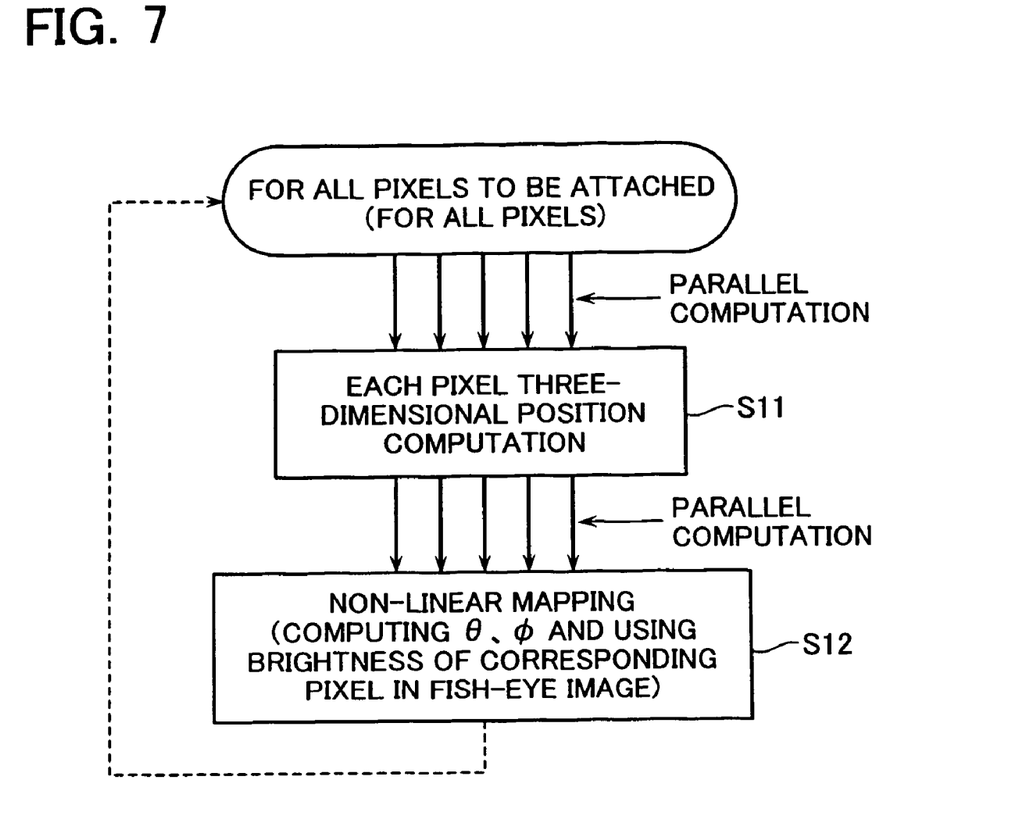
FIG. 7 is a flowchart of the operation of the dewarping-computing module in FIG. 6.

As seen in the equations (Equations 1 to 5), the computation processing of the three-dimensional position (S11) and non-linear texture mapping processing (S12) can be performed independently for each pixel. Processings for a plurality of pixels can thus be computed in parallel. As shown in FIG. 7, therefore, more hardware resources available such as CPU can provide more parallelism and less computation time in the computation processing (S11 and S12). This can draw a high-image-quality image in real-time and in an interactive manner.

The Second Embodiment

The processing of dewarping computing module 22 can be performed even more quickly using the graphics function such as a graphics dedicated processor (GPU). Specifically, significant processing can be performed on the graphics-board side by considering plane A indicating the drawing area in FIG. 1 as the object of the texture mapping performed in three-dimension.

Figure 8:
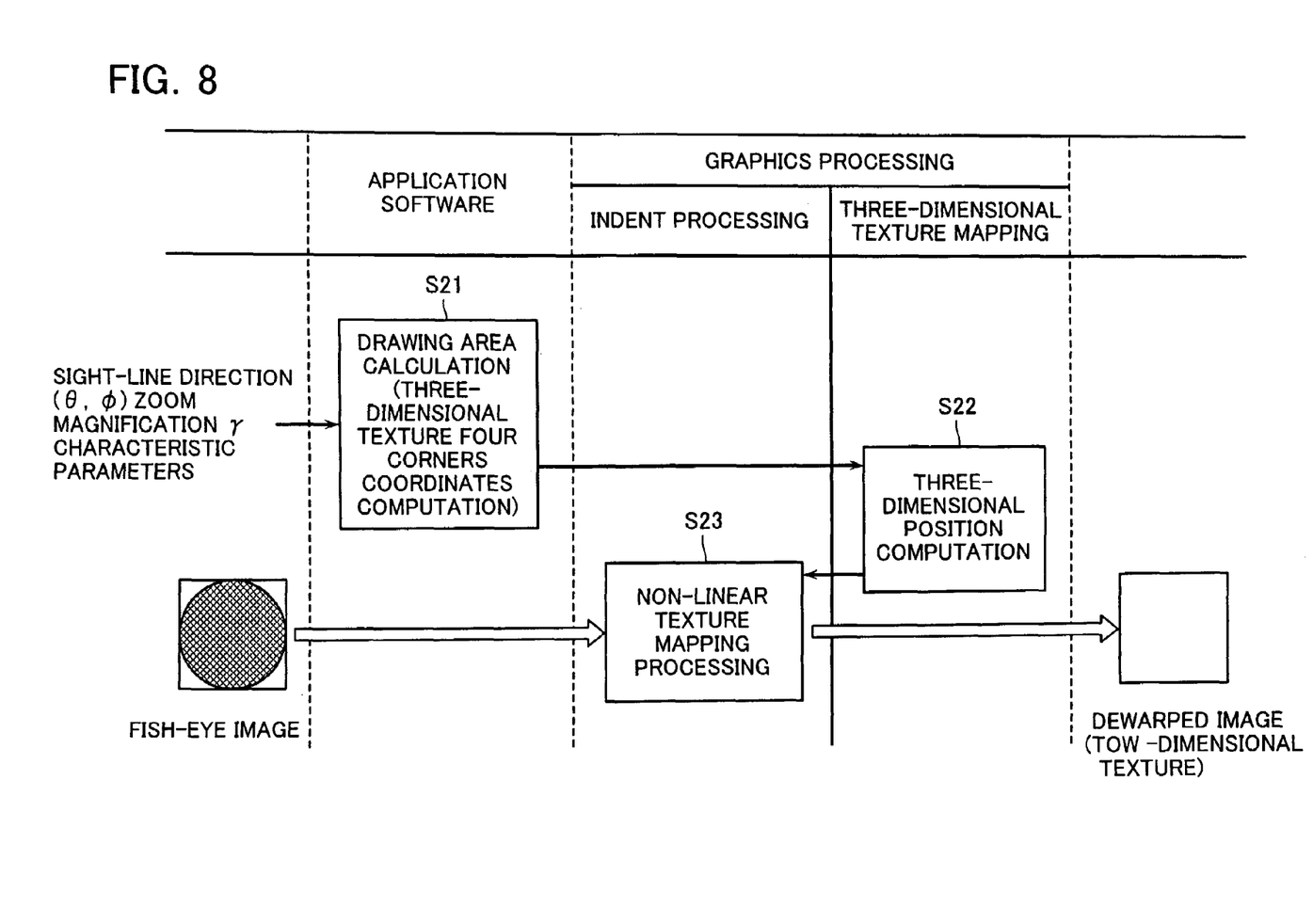
FIG. 8 shows a processing of an image-providing device according to the second embodiment of the present invention.

FIG. 8 shows the dewarping processing using the graphics function. The processing falls into application software and graphics processing. The application software calculates the three-dimensional position of each point at four corners in the drawing area (P0, P1, P2, and P3 in FIG. 2) (S21). The three-dimensional texture mapping and indent processing of the graphics processing on the graphics-board side performs the computation of each pixel position in the drawing area (S22) and non-linear texture mapping processing (S23). The interpolation processing from the three-dimensional positions of the four corners computes each pixel position in the drawing area.

The calculation processing of the three-dimensional position of each point at four corners in the drawing area (S21) determines the direction vector V as shown in FIG. 2 based on the sight-line direction (theta, phi), zoom magnification (field angle gamma), and characteristic parameters which are provided as input information. Axis vector Eu may be determined since its Z-component is zero and it is orthogonal with the direction vector V.

The following Equation 6 can compute axis vector Ev.

$$Ev = V \times Eu \text{(vector outer product)} \quad \text{(Equation 6)}$$

Because of the zoom magnification (field angle gamma) being defined, plane A to be displayed has an extent within (−tan gamma/2, tan gamma/2) on Eu-axis. Because of the aspect ratio alpha being known from the drawing window size, the extent is within (−alpha*tan gamma/2, alpha*tan gamma/2) on Ev-axis. The three-dimensional coordinate values at four corners can thus be determined as follows using vector notation.

$$V + (-\tan \text{gamma}/2)Eu + (-\text{alpha}*\tan \text{gamma}/2)Ev$$

$$V + (-\tan \text{gamma}/2)Eu + (\text{alpha}*\tan \text{gamma}/2)Ev$$

$$V + (\tan \text{gamma}/2)Eu + (-\text{alpha}*\tan \text{gamma}/2)Ev$$

$$V + (\tan \text{gamma}/2)Eu + (\text{alpha}*\tan \text{gamma}/2)Ev \quad \text{(Equation 7)}$$

Three-dimensional coordinates (Px, Py, Pz) of each point interpolated is then computed on the graphics-board side. The inverse function of the trigonometric function in the above-described Equation 3 used in non-linear texture mapping processing (S23) can be processed even more quickly by approximating the numerator and denominator with four-dimensional rational polynomials.

The Third Embodiment

When the drawing area is previously established, and the processing is limited to this drawing area, only a portion of the original fish-eye image G will be processed. Management function unit 21 in FIG. 4 thus cuts out a portion of the original fish-eye image G for the processing.

Figure 9:
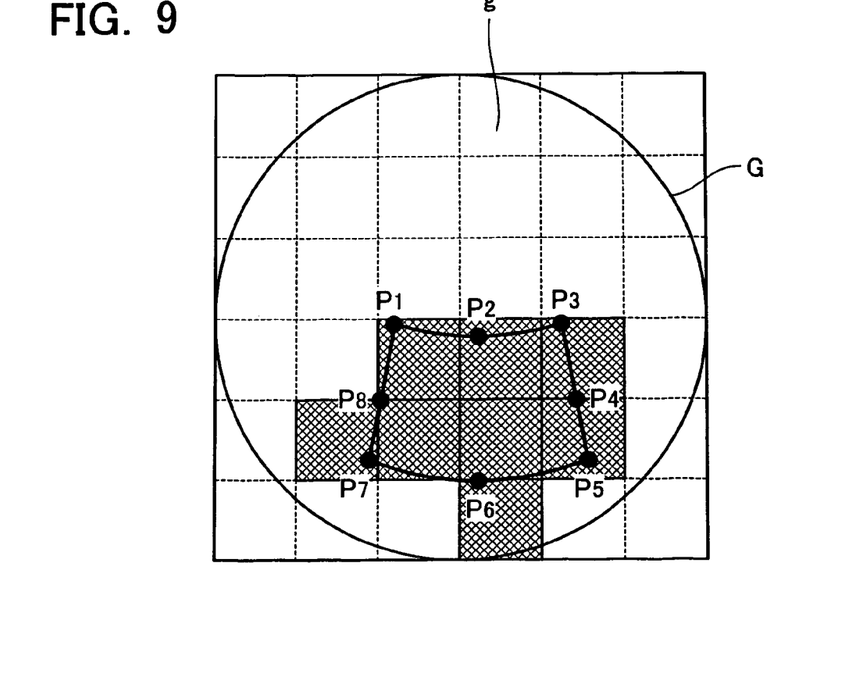
FIG. 9 shows a fish-eye image divided into a plurality of blocks that is handled in an image-providing device according to the third embodiment of the present invention.

Suppose that, for example, fish-eye image G divides into a plurality of blocks g and the decoding processing occurs for each block, as in FIG. 9. In the embodiments of the present invention, it is supposed that Ku and Kv shown in Equation 1 and three-dimensional positions at four corners shown in Equation 7 are determined. The embodiment then uses such information to calculate the coordinate values of eight points P1 to P8 around the area to be processed, and incorporates only blocks g (hatched blocks in FIG. 9) containing these coordinate values as the blocks to be processed in input processing unit 11. This is possible in MPEG 2 and JPEG and the like, for example, by specifying the macro blocks to be processed. In CMOS camera, only cells to be processed may be captured.

Step S6 in FIG. 5 shows this processing. After the values of Ku and Kv are computed (S5), the cut-out blocks in the original fish-eye image are calculated (S6), and the limited number of images are read for the higher speed processing.

The Fourth Embodiment

Figure 10:
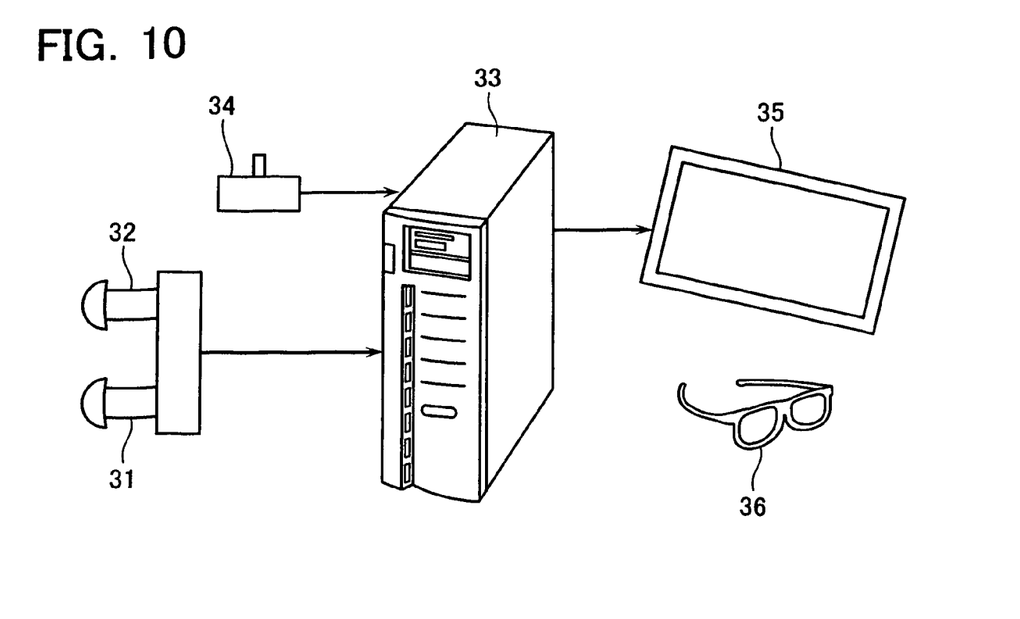
FIG. 10 shows a stereo image display system according to the fourth embodiment of the present invention.

FIG. 10 shows the stereo image display system according to the fourth embodiment of the present invention. This system includes: two fish-eye-lens-equipped cameras 31 and 32 disposed in parallel; computer 33 containing two sets of image providing devices for the dewarping processing of the right and left fish-eye images from cameras 31 and 32; input device 34 for inputting the sight-line direction and zoom magnification to computer 33; output device 35 such as a monitor for alternately displaying the right and left dewarped images dewarped by computer 33; and liquid crystal shutter glasses 36 operating in synchronization with output device 35. Output device 35 may use a naked-eye stereovision display to omit liquid crystal shutter glasses 36.

Figure 11:
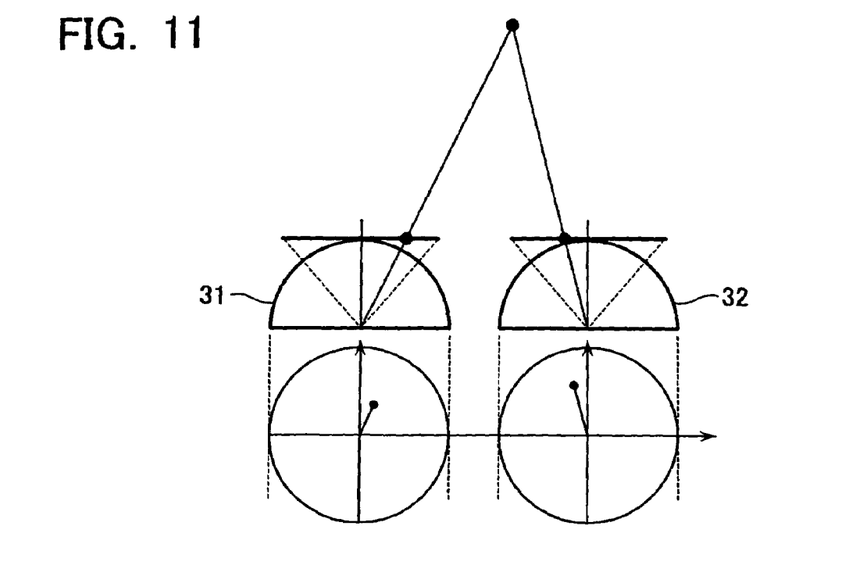
FIG. 11 illustrates the operation of the system in FIG. 10.
Figure 12:
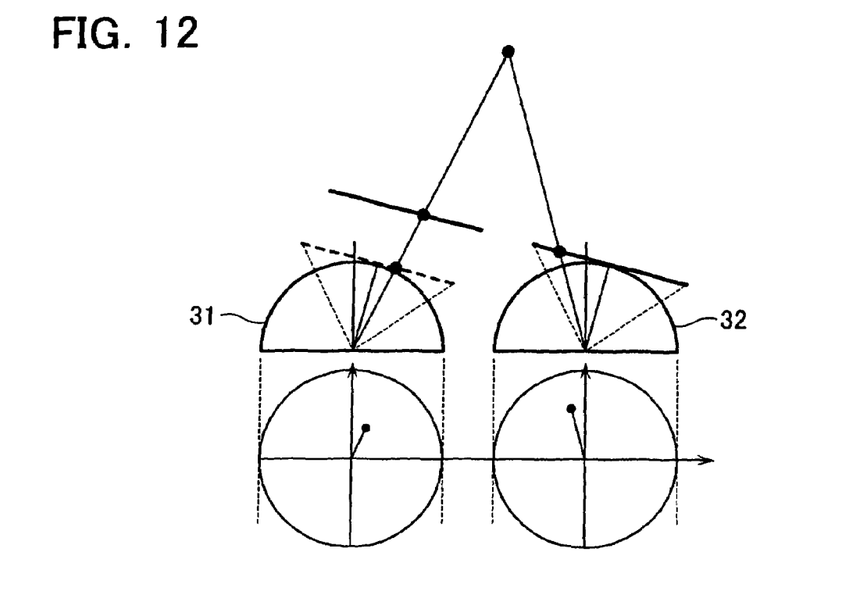
FIG. 12 illustrates the operation of the system in FIG. 10.

As shown in FIG. 11, virtual camera planes can be provided to the user which planes specify the same sight-line direction and zoom magnification for the two cameras corresponding to the right eye and left eye, respectively, and the stereoscopic images can be provided even by changing the virtual camera planes in an interactive manner at the same time. Specifically, images in the desired direction can be observed stereoscopically in an interactive manner. When the sight-line changes from the front, a difference always occurs in the depth between one virtual camera plane and the other as shown in FIG. 12. One plane can thus be corrected to be parallel with respect to the sight-line direction to make it possible to observe images stereoscopically.

As described above, the distortion of the fish-eye lens can be dewarped quickly to help draw moving images quickly at any sight line and zoom. In addition, monitoring and appreciation can be done with interactive stereoscopic images.

Such a system can draw moving images quickly and apply to broadcasting area available in real-time, image monitoring for in-vehicle use, and the like. Additionally, use of the system in stereovision can extend the appreciation of contents in the broadcasting area, for example. For monitoring use, the system can be mounted on a vehicle for looking around extensively and stereoscopically in operating the vehicle in a narrow space such as parallel parking, which is very useful.

INDUSTRIAL APPLICABILITY

The present invention is suited for application in real-time distributed contents such as broadcasting and mobile phone service, recording-and-reproducing type contents such as packaged media, and the like, particularly, in surveillance for vehicle operation support, and plant monitoring.

Additionally, use of the system in stereovision can extend the appreciation of contents in the broadcasting area, for example. For monitoring use, the system can be mounted on a vehicle for looking around extensively and stereoscopically in operating the vehicle in a narrow space such as parallel parking, which is very useful.

What is claimed is:

1. An image-providing device comprising:
   a fish-eye image input device inputting fish-eye image;
   a fish-eye image storage device storing said input fish-eye image;
   a visual-field information input device inputting in real-time visual-field information including information on sight-line direction (theta, phi) and on field angle (gamma) in visual-field area of said fish-eye image;
   a drawing area calculation device for calculating in real-time, using said input visual-field information, each pixel of a drawing area in a plane which is orthogonal to said sight-line direction and has an extent determined by said field angle; and
   a dewarping processing device determining a pixel position in said fish-eye image which corresponds to each pixel position in said calculated drawing area to form in real-time a dewarped image from the fish-eye image with its distortion removed.

2. An image-providing device according to claim 1, wherein said fish-eye image is a moving image.

3. An image providing device according to claim 1 wherein said fish-eye image is an image derived from an object imaged on a hemispherical surface of a virtually established hemisphere being developed on a plane, said drawing area calculating device calculates a plane tangent to said hemispherical surface as the drawing area, said dewarping processing device comprises:
   a three-dimensional position computation device computing, for each pixel in said calculated drawing area, its three-dimensional position in a three-dimensional coordinate system with an origin at a center of a bottom circle of said hemisphere; and
   a non-linear mapping device calculating a zenithal angle theta s and an azimuthal angle phi s of an axis passing through said origin and a three-dimensional position of each pixel in said calculated drawing area, and using the zenithal angle and the azimuthal angle as a basis to determine a pixel position in said fish-eye image.

4. An image providing device according to claim 1, wherein said drawing area calculating device calculates pixel positions at four corners of said drawing area, said dewarping processing device calculates each pixel position in said drawing area from the pixel positions at the four corners in said drawing area by interpolation processing.

5. An image providing device according to claim 1, wherein said fish-eye images are divided into a plurality of blocks, each of which is separately accessible, said image providing device further comprises to-be-read block calculating device calculating said blocks to be read from said calculated drawing area, and said fish-eye image input device only inputs said calculated block to be read.

6. An image providing device according to claim 1, wherein said fish-eye image includes right and left two-system images for stereo display, said drawing area calculating device calculates a drawing area for each of said two-system fish-eye images based on said input visual-field information, and said dewarping processing device forms, for each of said calculated two-system drawing areas, a dewarped image from each fish-eye image.

7. An image providing method comprising:
inputting a fish-eye image and storing it in a storage device;
inputting in real-time visual-field information including information on sight-line direction (theta, phi) and on field angle (gamma) in visual-field area of said fish-eye image;
calculating in real-time, using said input visual-field information, each pixel of a drawing area in a plane which is orthogonal to said sight-line direction and has an extent determined by said field angle; and
determining a pixel position in said fish-eye image which corresponds to each pixel position in said calculated drawing area to form in real-time a dewarped image from the fish-eye image with its distortion removed.

8. An image providing method according to claim 7, wherein said fish-eye image is a moving image.

9. An image providing method according to claim 7, wherein said fish-eye image is an image derived from an object imaged on a hemispherical surface of a virtually established hemisphere being developed on a plane, said step of calculating a drawing area in real-time calculates a plane tangent to said hemispherical surface as the drawing area, and said step of forming a dewarped image in real-time comprises:

computing, for each pixel in said calculated drawing area, its three-dimensional position in a three-dimensional coordinate system with an origin at a center of a bottom circle of said hemisphere; and
calculating a zenithal angle theta s and an azimuthal angle phi s of an axis passing through said origin and a three-dimensional position of each pixel in said calculated drawing area, and using the zenithal angle and the azimuthal angle as a basis to determine a pixel position in said fish-eye image.

10. An image providing method according to claim 7, wherein said step of calculating a drawing area in real-time calculates pixel positions at four corners of said drawing area, and said step of forming a dewarped image in real-time calculates each pixel position in said drawing area from the pixel positions at the four corners in said drawing area by interpolation processing.

11. An image providing method according to claim 7, further comprising:
dividing said fish-eye images into a plurality of blocks, each of which is separately accessible; and
calculating said blocks to be read from said calculated drawing area.

12. An image providing method according to claim 7, wherein said fish-eye image includes right and left two-system images for stereo display, said step of calculating a drawing area in real-time calculates a drawing area for each of said two-system fish-eye images based on said input visual-field information, and said step of forming a dewarped image in real-time forms, for each of said calculated two-system drawing areas, a dewarped image from each fish-eye image.

* * * * *

UNITED STATES PATENT AND TRADEMARK OFFICE
CERTIFICATE OF CORRECTION

| | |
|---|---|
| PATENT NO. | : 7,570,280 B2 |
| APPLICATION NO. | : 11/053947 |
| DATED | : August 4, 2009 |
| INVENTOR(S) | : Ozaki |

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 973 days.

Delete the phrase "by 973 days" and insert -- by 1212 days --

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,570,280 B2 | Page 1 of 1 |
| APPLICATION NO. | : 11/053947 | |
| DATED | : August 4, 2009 | |
| INVENTOR(S) | : Ozaki | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1212 days.

Signed and Sealed this

Eighth Day of January, 2013

David J. Kappos
*Director of the United States Patent and Trademark Office*